US011413754B2

(12) United States Patent
Morioka et al.

(10) Patent No.: US 11,413,754 B2
(45) Date of Patent: Aug. 16, 2022

(54) ROBOT SYSTEM

(71) Applicant: FANUC CORPORATION, Yamanashi (JP)

(72) Inventors: Masahiro Morioka, Yamanashi (JP); Takatoshi Iwayama, Yamanashi (JP); Junya Fujita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 257 days.

(21) Appl. No.: 16/105,412

(22) Filed: Aug. 20, 2018

(65) Prior Publication Data
US 2019/0070730 A1 Mar. 7, 2019

(30) Foreign Application Priority Data
Sep. 7, 2017 (JP) .............................. JP2017-171939

(51) Int. Cl.
G05B 19/04 (2006.01)
G05B 19/18 (2006.01)
B25J 9/16 (2006.01)

(52) U.S. Cl.
CPC ... *B25J 9/1666* (2013.01); *G05B 2219/40202* (2013.01)

(58) Field of Classification Search
CPC . B25J 9/1666; B25J 19/06; B25J 19/02; B25J 9/161; G05B 2219/40202
See application file for complete search history.

(56) References Cited

U.S. PATENT DOCUMENTS

2009/0030549 A1   1/2009 Sakai et al.
2011/0015785 A1*  1/2011 Tsusaka ................. B25J 9/0003
                                                    700/254
(Continued)

FOREIGN PATENT DOCUMENTS

DE        10324628 A1   12/2004
DE    102005003827 A1    7/2006
(Continued)

OTHER PUBLICATIONS

Japanese Office Action dated Jul. 16, 2019, for Japanese Patent Application No. 2017-171939.
(Continued)

*Primary Examiner* — Harry Y Oh
*Assistant Examiner* — Sohana Tanju Khayer
(74) *Attorney, Agent, or Firm* — Karceski IP Law, PLLC

(57) ABSTRACT

The present invention provides a robot system including: a movable human-collaborative robot including a human-collaborative robot, and a moving device that moves the human-collaborative robot mounted thereon; a control unit that controls the movable human-collaborative robot; and an approach sensor that detects approach of a human to the movable human-collaborative robot. The human-collaborative robot includes a human detection sensor that detects approach or contact of a human to or with the movable human-collaborative robot. When the approach sensor has detected the approach of a human, the control unit restricts the operation of at least the moving device and, when the human detection sensor has detected the approach of or contact with a human, the control unit performs control so as to stop the movable human-collaborative robot or so as to avoid the approach of or contact with the human.

14 Claims, 3 Drawing Sheets

(56) References Cited

U.S. PATENT DOCUMENTS

| | | | |
|---|---|---|---|
| 2014/0358284 A1* | 12/2014 | Laurent | G05B 19/409 700/264 |
| 2015/0049911 A1 | 2/2015 | Doettling et al. | |
| 2016/0016315 A1* | 1/2016 | Kuffner, Jr. | B25J 19/06 901/49 |
| 2016/0031086 A1 | 2/2016 | Tanabe et al. | |
| 2016/0062345 A1 | 3/2016 | Stubbs et al. | |
| 2016/0195390 A1 | 7/2016 | Nissen et al. | |
| 2017/0261962 A1* | 9/2017 | Naitou | G05B 19/048 |
| 2017/0329321 A1* | 11/2017 | Dai | F16P 3/142 |
| 2017/0334076 A1* | 11/2017 | Bordegnoni | G01B 7/023 |
| 2018/0001476 A1* | 1/2018 | Tan | B61G 7/04 |
| 2018/0043549 A1* | 2/2018 | Su | B25J 13/081 |
| 2018/0181104 A1 | 6/2018 | Stubbs et al. | |
| 2019/0039254 A1 | 2/2019 | Kamon et al. | |
| 2019/0063907 A1* | 2/2019 | Grau | H04N 5/3572 |

FOREIGN PATENT DOCUMENTS

| | | |
|---|---|---|
| DE | 102012102236 A1 | 9/2013 |
| DE | 202013104860 U1 | 2/2015 |
| JP | 60131391 U | 9/1985 |
| JP | H0633210 U | 4/1994 |
| JP | H08118283 A | 5/1996 |
| JP | H11226889 A | 8/1999 |
| JP | 2000033592 A | 2/2000 |
| JP | 2000246684 A | 9/2000 |
| JP | 2001273032 A | 10/2001 |
| JP | 2002144265 A * | 5/2002 |
| JP | 3307288 B2 | 7/2002 |
| JP | 2002264070 A | 9/2002 |
| JP | 3419313 B2 | 6/2003 |
| JP | 2005059161 A | 3/2005 |
| JP | 2006043792 A | 2/2006 |
| JP | 4764070 B2 | 8/2011 |
| JP | 6140114 B2 | 5/2017 |
| JP | 2017140660 A | 8/2017 |
| WO | 2007085330 A1 | 8/2007 |

OTHER PUBLICATIONS

Japanese Search Report by Registered Searching Authority with Japanese Office Action dated Jul. 16, 2019, for Japanese Patent Application No. 2017-171939.

German Office Action dated Apr. 29, 2020, for German Patent Application No. 102018121388.3.

* cited by examiner

ROBOT SYSTEM

CROSS-REFERENCE TO RELATED APPLICATIONS

This application is based on and claims priority to Japanese Patent Application No. 2017-171939, filed on Sep. 7, 2017, the entire contents of which are incorporated herein by reference.

FIELD OF THE INVENTION

The present invention relates to robot systems.

BACKGROUND OF THE INVENTION

A known movable human-collaborative robot in the related art includes a dolly that moves with a human-collaborative robot mounted thereon and determines whether it is in contact with a human by detecting an external force acting on a robot support part via an outer sheath provided on the robot support part and covering the dolly (for example, see Japanese Patent No. 61-40114).

SUMMARY OF THE INVENTION

The present invention has been made in view of the above-described circumstances, and an object thereof is to provide a robot system that can ensure safety when contact with a human occurs without lowering the production efficiency.

An aspect of the present invention provides a robot system including: a movable human-collaborative robot including a human-collaborative robot that performs tasks in collaboration with a human, and a moving device that moves the human-collaborative robot mounted thereon; a control unit that controls the movable human-collaborative robot; and an approach sensor that detects approach of a human to the movable human-collaborative robot due to the human entering a first region. The human-collaborative robot includes a human detection sensor that detects approach or contact of a human to or with the human-collaborative robot due to the human entering a second region. When the approach sensor has detected approach of a human to the movable human-collaborative robot due to the human entering the first region, the control unit restricts the operation of at least the moving device such that the operating speeds of the respective parts of the human-collaborative robot and moving device relative to a floor surface are lower than or equal to predetermined collaborative operating speeds at which a human can perform tasks in collaboration therewith and, when the human detection sensor has detected the approach or contact of a human to or with the human-collaborative robot due to the human entering the second region, the control unit performs control so as to stop the movable human-collaborative robot or so as to avoid the approach of or contact with the human.

In the above aspect, the second region may be included in the first region.

In the above aspect, the human detection sensor may be a proximity sensor that detects the approach of a human.

In the above aspect, the human detection sensor may be a contact sensor that detects contact with a human.

In the above aspect, the human detection sensor may be a force sensor or a torque sensor that detects contact with a human.

In the above aspect, the human detection sensor may be accommodated in the human-collaborative robot.

In the above aspect, when the approach sensor has detected the approach of a human to the movable human-collaborative robot due to the human entering the first region, the control unit may control the operating speed of the human-collaborative robot to a value lower than or equal to the collaborative operating speed and may stop the moving device.

In the above aspect, when the approach sensor has detected the approach of a human to the movable human-collaborative robot due to the human entering the first region, the control unit may limit the operations of both the human-collaborative robot and the moving device.

In the above aspect, when the approach sensor has not detected the approach of a human to the movable human-collaborative robot due to a human entering the first region, the control unit may perform control such that the human-collaborative robot and the moving device can operate at their maximum operating speeds.

In the above aspect, the moving device may include a base fixed to the floor surface, and a movable part on which the human-collaborative robot is mounted, the movable part being horizontally movable relative to the base.

In the above aspect, the moving device may be a self-travelling dolly that travels with the human-collaborative robot mounted on a movable part thereof.

In the above aspect, the approach sensor may be installed on the floor surface around the moving device.

In the above aspect, the approach sensor may be provided on the movable part.

DESCRIPTION OF EMBODIMENT(S) OF THE INVENTION

A robot system 1 according to an embodiment of the present invention will be described below with reference to the drawings.

Figure 1:
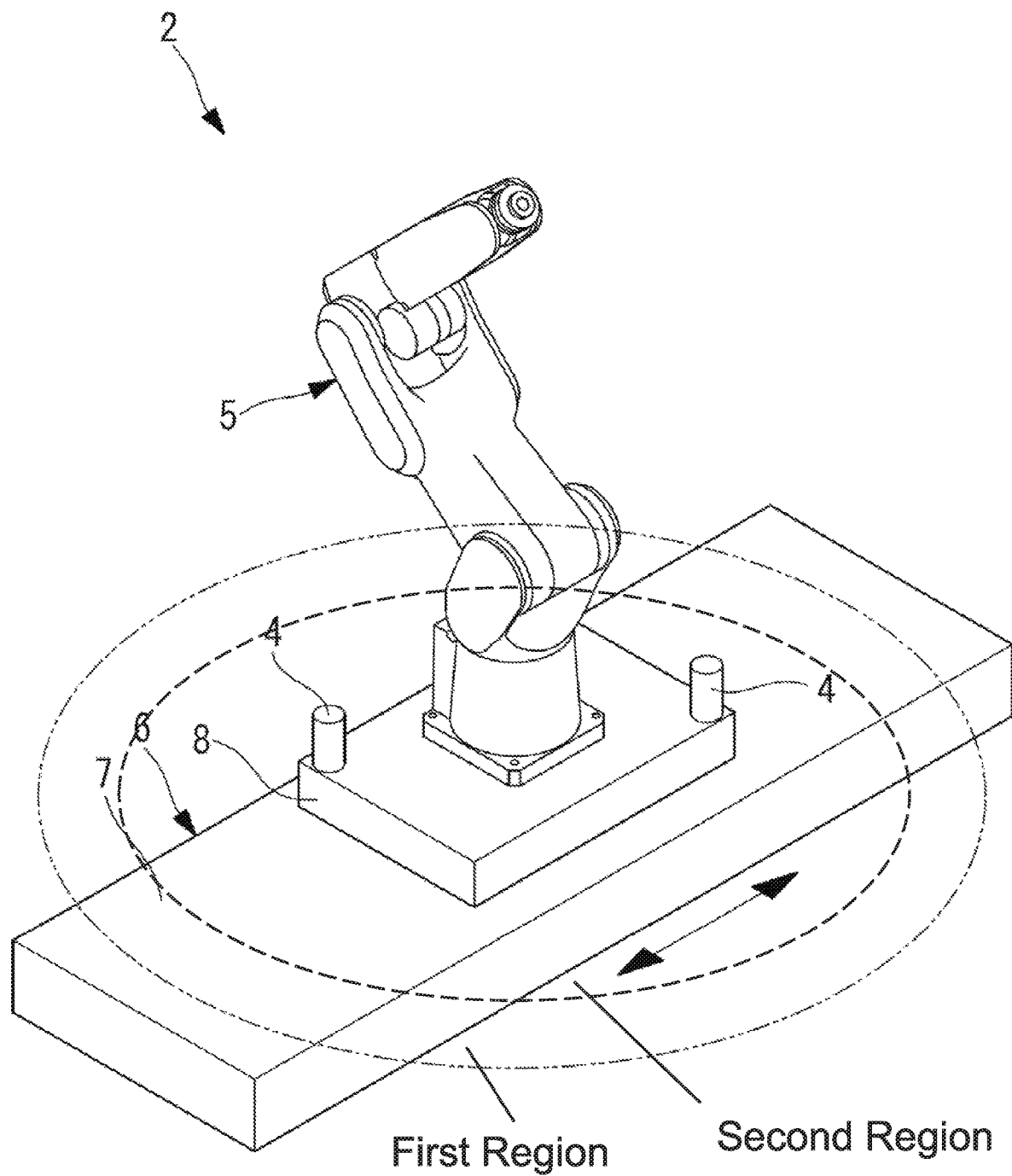
FIG. 1 is a perspective view showing a movable human-collaborative robot of a robot system according to an embodiment of the present invention.
Figure 2:
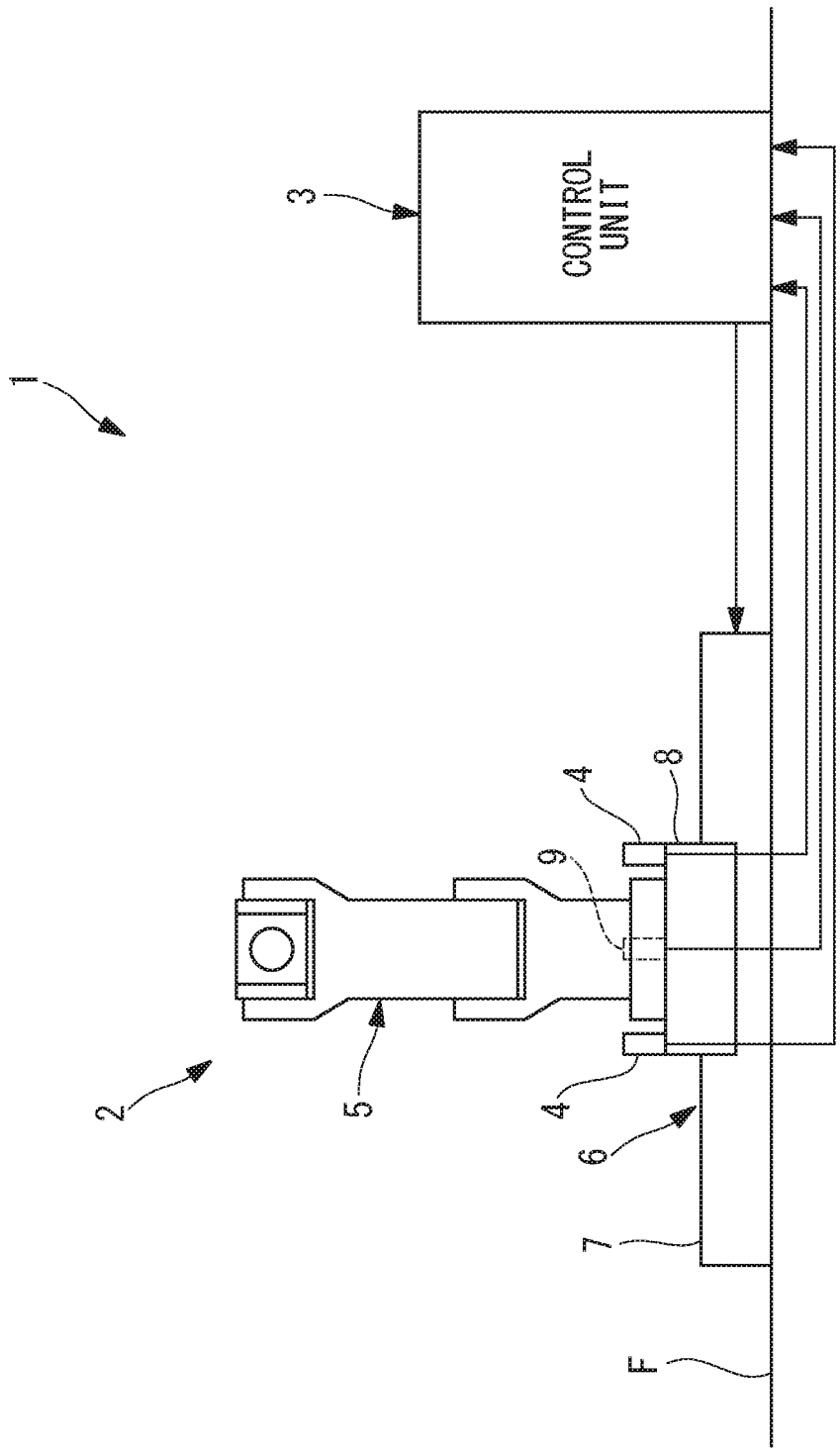
FIG. 2 shows the overall configuration of the robot system in FIG. 1.

As shown in FIGS. 1 and 2, the robot system 1 according to this embodiment includes a movable human-collaborative robot 2, a control unit 3 that controls the movable human-collaborative robot 2, and an approach sensor 4 that detects the approach of a human toward the movable human-collaborative robot 2 due to the human entering a predetermined region (a first region).

The movable human-collaborative robot 2 includes a six-axis articulated human-collaborative robot 5, which performs tasks in collaboration with a human, and a moving device 6, which moves the human-collaborative robot 5 mounted thereon solely in the horizontal direction. The type of the human-collaborative robot 5 is not limited to a six-axis articulated type, but may be of any type.

The moving device 6 is a running axis including a base 7 provided on a floor surface F and a slider (movable part) 8 capable of moving solely in the horizontal direction relative to the base 7. The base 7 of the running axis does not necessarily have to be provided on the floor surface F, but may be disposed along the ceiling of a gate-shaped stand or along a wall that is at an angle with respect to the floor surface F.

The human-collaborative robot 5 accommodates a contact sensor (human detection sensor) 9 that detects contact between a human and any part of the human-collaborative robot 5. In a situation in which contact with a human can occur, the human-collaborative robot 5 can reduce the kinetic energy thereof to ensure safety when contact with a human occurs by operating at an operating speed lower than or equal to a predetermined operating speed (collaborative operating speed). When the contact sensor 9 has detected contact with a human, the human-collaborative robot 5 stops the operation to ensure higher safety.

The approach sensor 4 is, for example, a scanner sensor that measures the distance to an approaching object by scanning laser light and is fixed to the slider 8. Hence, the approach sensor 4 can measure the distance to an approaching object at any destination of the slider 8 under the same conditions, and thus can detect, in a non-contact manner, the approach of a human from the outside to the inside of a predetermined region (indicated by a two-dot chain line in FIG. 1) surrounding the slider 8.

The control unit 3 causes the human-collaborative robot 5 and the moving device 6 to operate according to an operating program that is taught in advance.

In a state in which the approach sensor 4 does not detect the approach of a human to the inside of the predetermined region from the outside, the control unit 3 performs control such that both the human-collaborative robot 5 and the moving device 6 can operate at the maximum operating speeds.

When the approach sensor 4 has detected the approach of a human to the inside of the predetermined region from the outside, the control unit 3 stops the operation of the moving device 6 and limits the operation of the human-collaborative robot 5 so as to operate at an operating speed lower than or equal to the collaborative operating speed.

When the contact sensor 9 accommodated in the human-collaborative robot 5 has detected contact between a human and the human-collaborative robot 5, the control unit 3 stops the operation of the human-collaborative robot 5.

Figure 3:
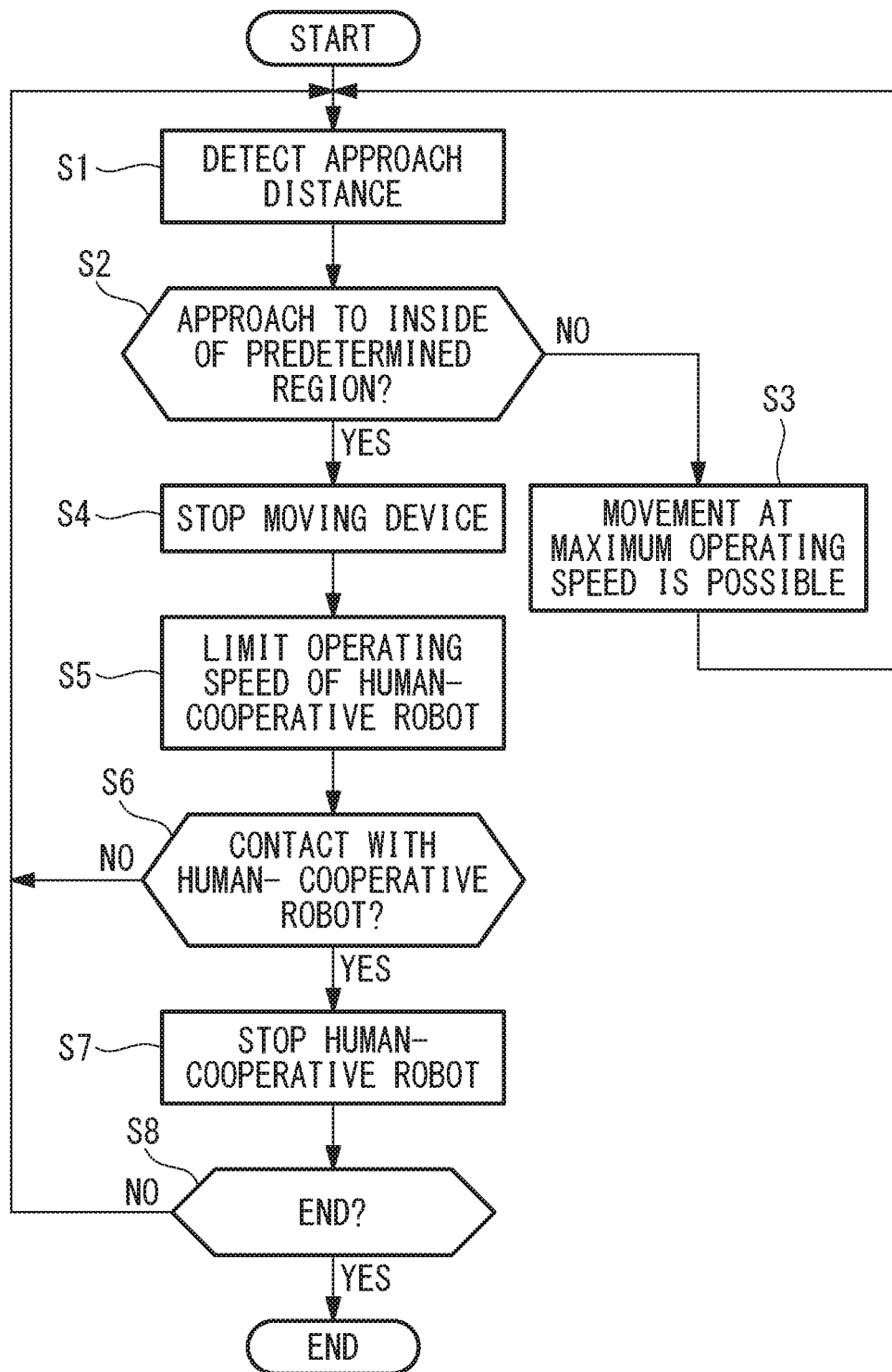
FIG. 3 is a flowchart explaining the operation of the robot system in FIG. 1.

In the thus-configured robot system 1 according to this embodiment, as shown in FIG. 3, the approach sensor 4 detects the distance (approach distance) to a nearby object (step S1), and the detection result is transmitted to the control unit 3. From the transmitted distance information, the control unit 3 determines whether or not a human is approaching the inside of the predetermined region around the slider 8 of the movable human-collaborative robot 2 from the outside (step S2).

When it is determined that approach of a human to the inside of the predetermined region from the outside has not been detected, the control unit 3 controls the movable human-collaborative robot 2, which includes the human-collaborative robot 5 and the moving device 6, so as to be able to operate at the maximum operating speeds (step S3). Then, the operation from step S1 is performed. In the related-art method in which contact with an outer sheath covering a moving dolly is detected, the moving dolly and the human-collaborative robot 5 need to operate at collaborative operating speeds, which are limited compared with the maximum operating speeds, to ensure safety when contact occurs. In contrast, in the robot system 1 according to this embodiment, when there is no possibility of contact between a human and the movable human-collaborative robot 2, the movable human-collaborative robot 2 can move at the maximum operating speed. Hence, it is possible to significantly improve the production efficiency.

When it is determined that the approach sensor 4 has detected the approach of a human to the inside of the predetermined region from the outside, the control unit 3 stops the moving device 6 (step S4) and causes the human-collaborative robot 5 to operate at an operating speed lower than or equal to the collaborative operating speed (step S5). By doing so, it is possible to allow the human-collaborative robot 5 to operate alone, as in the case without the moving device 6, thus ensuring safety when contact occurs.

In this case, by achieving a state in which the moving device 6 is stopped while the human-collaborative robot 5 is allowed to continue to operate, it is possible to continue the task without completely stopping the movable human-collaborative robot 2. This also leads to an advantage in that it is possible to improve the production efficiency.

Also in this case, in the robot system 1 according to this embodiment, the weight of the slider 8 does not increase compared with a related-art method in which the weight of the slider 8 increases due to the outer sheath covering the moving dolly. Hence, even if the collaborative operating speed itself is increased, the kinetic energy is reduced to a low level, thus ensuring safety when contact occurs. This also improves the production efficiency.

In a state in which the human-collaborative robot 5 is operated at an operating speed lower than or equal to the collaborative operating speed, it is determined whether contact between a human and the human-collaborative robot 5 has been detected by the contact sensor 9 (step S6). When it is determined that contact has not been detected, the operation from step S1 is executed. When it is determined that contact has been detected, the control unit 3 performs control so as to stop the human-collaborative robot 5 (step S7). By doing so, similarly to the related-art system, it is possible to sufficiently ensure safety when contact with a human occurs.

After the human-collaborative robot 5 is stopped, it is determined whether or not the task will be completed (step S8).

In this embodiment, although the scanner sensor mounted on the slider 8 is employed as the approach sensor 4, instead, the approach of a human may be detected by scanner sensors provided at necessary positions on the floor surface F, or a sheet-like sensor spread on the floor surface F, which detects the approach of a human when the human walks on it, may be employed. Alternatively, a sensor including a camera mounted on the ceiling so as to face downward, the camera acquiring an image of the movable human-collaborative robot 2 and the vicinity thereof to detect the approach of a human by processing the image, may be employed.

In this embodiment, when the approach sensor 4 has detected the approach of a human, the moving device 6 is stopped, and the human-collaborative robot 5 is allowed to continue to operate at an operating speed lower than or equal to the collaborative operating speed. Instead, it is possible to allow the moving device 6 to continue to operate at a low speed by limiting the operating speed thereof and to also allow the human-collaborative robot 5 to continue to operate at a limited operating speed such that the operating speeds of the respective parts thereof relative to the floor surface F are lower than or equal to the collaborative operating speed. With this configuration, even when the operation direction of the moving device 6 and the operation direction of the human-collaborative robot 5 are equal, the combined operating speed is limited to be lower than or equal to the collaborative operating speed.

In this embodiment, although the moving device 6 having a configuration in which the human-collaborative robot 5 is mounted on the slider 8, which is supported so as to be movable in the horizontal direction relative to the base 7 disposed on the floor surface F, has been described as an example, instead, it is possible to employ a self-travelling dolly that travels with the human-collaborative robot 5 mounted thereon. In such a case, because the moving area of the self-travelling dolly is wide, it is preferable that the approach sensor 4 be mounted on the self-travelling dolly. When the moving area is limited, it is possible to employ an approach sensor 4 that is provided on the floor surface F or on the ceiling around the moving device 6.

In this embodiment, although the system employing the contact sensor 9 as the human detection sensor has been shown as an example, instead, a force sensor or a torque sensor may be employed. A proximity sensor may be employed as the human detection sensor. In that case, when the proximity sensor has detected the approach of a human due to the human entering a predetermined region (second region), the operation is stopped. It is preferable that the predetermined region (first region) covered by the approach sensor include the predetermined region (second region) covered by the proximity sensor.

In this embodiment, the system in which the operation is stopped when contact between a human and the human-collaborative robot 5 is detected by the contact sensor 9 has been illustrated as an example. Instead, the system may be operated so as to avoid approach of or contact with a human when the contact sensor 9 has detected contact between the human and the human-collaborative robot 5.

In this embodiment, although the system in which the contact sensor 9 is accommodated in the human-collaborative robot 5 has been illustrated as an example, instead, a system in which the contact sensor 9 is provided outside the human-collaborative robot 5 may be employed.

As a result, the following aspect is derived from the above described embodiment.

An aspect of the present invention provides a robot system including: a movable human-collaborative robot including a human-collaborative robot that performs tasks in cooperation with a human, and a moving device that moves the human-collaborative robot mounted thereon; a control unit that controls the movable human-collaborative robot; and an approach sensor that detects approach of a human to the movable human-collaborative robot due to the human entering a first region. The human-collaborative robot includes a human detection sensor that detects approach or contact of a human to or with the human-collaborative robot due to the human entering a second region. When the approach sensor has detected approach of a human to the movable human-collaborative robot due to the human entering the first region, the control unit restricts the operation of at least the moving device such that the operating speeds of the respective parts of the human-collaborative robot and moving device relative to a floor surface are lower than or equal to predetermined collaborative operating speeds at which a human can perform tasks in cooperation therewith and, when the human detection sensor has detected the approach or contact of a human to or with the human-collaborative robot due to the human entering the second region, the control unit performs control so as to stop the movable human-collaborative robot or so as to avoid the approach of or contact with the human.

According to this aspect, when the movable human-collaborative robot, in which the human-collaborative robot is moved by the moving device, is operated, if the approach sensor has detected the approach of a human due to the human entering the first region, the control unit restricts the operation of at least the moving device such that the operating speeds of the respective parts of the human-collaborative robot and moving device relative to the floor surface are lower than or equal to predetermined collaborative operating speeds. In other words, as a result of the operating speeds of the respective parts of the human-collaborative robot and moving device relative to the floor surface being limited to values lower than or equal to the predetermined collaborative operating speeds, an increase in the kinetic energy is suppressed. When the human detection sensor has detected approach or contact of a human to or with the collaborative robot due to the human entering the second region, safety when approach of or contact with a human occurs is ensured by stopping the movable human-collaborative robot or by avoiding the approach of or contact with the human.

In this case, when the approach sensor has detected the approach of a human due to the human entering the first region, the operation of at least the moving device is limited. Because this eliminates the need for covering the movable part of the moving device with an outer sheath and, thus, does not increase the weight of the movable part, it is possible to prevent lowering of the production efficiency.

In the above aspect, the second region may be included in the first region.

With this configuration, when the approach of a human due to the human entering the first region is detected, the moving device is stopped, or the approach of or contact with the human is avoided, and when the approach of a human due to the human entering the second region is detected, control is performed such that the robot is also stopped or such that the approach of or contact with the human is avoided. Hence, when the human is inside the first region and outside the second region, the robot performs a planned operation, and thus, it is possible to prevent excessive lowering of the production efficiency.

In the above aspect, the human detection sensor may be a proximity sensor that detects the approach of a human.

In the above aspect, the human detection sensor may be a contact sensor that detects contact with a human.

In the above aspect, the human detection sensor may be a force sensor or a torque sensor that detects contact with a human.

In the above aspect, the human detection sensor may be accommodated in the human-collaborative robot.

In the above aspect, when the approach sensor has detected the approach of a human to the movable human-collaborative robot due to the human entering the first region, the control unit may control the operating speed of the human-collaborative robot to a value lower than or equal to the collaborative operating speed and may stop the moving device.

With this configuration, by stopping the moving device upon detection of the approach of a human due to the human entering the first region, the human-collaborative robot is made to be in a state operating alone at an operating speed lower than or equal to the collaborative operating speed, and thus, it is possible to easily ensure safety when contact with a human occurs. Furthermore, because it is possible to cause the human-collaborative robot to perform normal operation until the human detection sensor detects the approach or contact of a human to or with the collaborative robot due to the human entering the second region, it is possible to improve the production efficiency, compared with a case where the human-collaborative robot is completely stopped.

In the above aspect, when the approach sensor has detected the approach of a human to the movable human-collaborative robot due to the human entering the first region, the control unit may limit the operations of both the human-collaborative robot and the moving device.

With this configuration, it is possible to ensure safety when approach of or contact with a human occurs while continuing to move the human-collaborative robot with the moving device.

In the above aspect, when the approach sensor has not detected the approach of a human to the movable human-collaborative robot due to a human entering the first region, the control unit may perform control such that the human-collaborative robot and the moving device can operate at their maximum operating speeds.

With this configuration, when the approach sensor has not detected the approach of a human due to a human entering the first region, the human-collaborative robot and the moving device can fully operate, and thus, it is possible to further improve the production efficiency.

In the above aspect, the moving device may include a base fixed to the floor surface, and a movable part on which the human-collaborative robot is mounted, the movable part being horizontally movable relative to the base.

In the above aspect, the moving device may be a self-travelling dolly that travels with the human-collaborative robot mounted on a movable part thereof.

In the above aspect, the approach sensor may be installed on the floor surface around the moving device.

With this configuration, when the movable part is horizontally moved relative to the base fixed to the floor surface, the operation area of the human-collaborative robot is limited. Hence, by installing the approach sensor on the floor surface around the moving device, the approach of a human to the movable human-collaborative robot can be easily and more reliably detected. It is also possible to reduce the area of the first region covered by the approach sensor only in the direction in which the moving device moves horizontally. Even if a human approaches in a direction different from the moving direction, the operation of the moving device does not need to be limited, and thus, it is possible to prevent lowering of the production efficiency. By limiting the area of the first region covered by the approach sensor, it is also possible to minimize the number of the approach sensors installed.

When the moving device is a self-travelling dolly, the area over which the robot can move increases. Hence, it is possible to improve the transportation capacity of the robot and to reduce the number of robots installed, by making a single robot perform tasks at multiple places. Because the self-propelled dolly can be easily used in various facility layouts simply by changing the operating program thereof, not only can the robot be easily introduced in existing facilities, but also quick and flexible response to changes in the production plan, such as increase in the variety of produced articles, is possible without drastically changing the facility.

In the above aspect, the approach sensor may be provided on the movable part.

With this configuration, it is possible to detect the approach of a human under the same conditions at the respective destinations of the human-collaborative robot reached by the operation of the movable part. When the movable part moves over a wide area, the approach of or contact with a human due to the human entering the second region can be detected by a minimum number of human detection sensors. Hence, it is possible to reduce the cost.

The invention claimed is:

1. A robot system comprising:
a moving device that is moved on a floor surface;
a human-collaborative robot that is mounted on the moving device and that performs tasks in collaboration with a human, the human being moved on the floor surface;
a controller that controls an operation of the human-collaborative robot and a movement of the moving device;
a first sensor that detects an entry of the human into a first region around the human-collaborative robot; and
a second sensor that detects an entry of the human into a second region around the human-collaborative robot, the second region being included in the first region,
wherein, in response to detecting the entry of the human into the first region by the first sensor, the controller performs a first control that comprises controlling the movement of the moving device to restrict speed of the operation of the human-collaborative robot relative to the floor surface, and
after the speed of the operation of the human-collaborative robot relative to the floor surface is restricted, in response to detecting the entry of the human into the second region by the second sensor, the controller performs a second control that comprises controlling the operation of the human-collaborative robot to further restrict the speed of the operation of the human-collaborative robot relative to the floor surface.

2. The robot system according to claim 1, wherein the second sensor is a contact sensor that detects contact between the human-collaborative robot and the human due to entry of the human into the second region.

3. The robot system according to claim 1, wherein the second sensor is a force sensor or a torque sensor that detects contact between the human-collaborative robot and the human due to the entry of the human into the second region.

4. The robot system according to claim 1, wherein the second sensor is accommodated in the human-collaborative robot.

5. The robot system according to claim 1, wherein, when the first sensor does not detect the entry of the human into the first region, the controller performs control such that the human-collaborative robot and the moving device operate at their maximum operating speeds.

6. The robot system according to claim 1, wherein the moving device includes a base provided on the floor surface, and a slider on which the human-collaborative robot is mounted, the slider being configured to move horizontally relative to the base.

7. The robot system according to claim 1, wherein the moving device is a self-travelling dolly that travels with the human-collaborative robot mounted on a slider thereof.

8. The robot system according to claim 1, wherein the first sensor is installed on the floor surface around the moving device.

9. The robot system according to claim 6, wherein the first sensor is provided on the slider.

10. The robot system according to claim 1, wherein the second sensor is a proximity sensor that detects approach of the human to the human-collaborative robot due to the entry of the human into the second region.

11. The robot system according to claim 1, wherein the first control comprises stopping or decelerating the movement of the moving device so that the speed of the operation of the human-collaborative robot relative to the floor surface is lower than or equal to a predetermined collaborative operating speed at which the human can perform tasks in collaboration with the human-collaborative robot.

12. The robot system according to claim 1, wherein the second control comprises decelerating the operation of the human-collaborative robot so that the speed of the operation of the human-collaborative robot relative to the floor surface is lower than or equal to a predetermined collaborative operating speed at which the human can perform tasks in collaboration with the human-collaborative robot.

13. The robot system according to claim 1, wherein the second control comprises stopping the operation of the human-collaborative robot.

14. The robot system according to claim 1, wherein the second control comprises restricting the speed of the operation of the human-collaborative robot so that contact between the human-collaborative robot and the human is avoided.

* * * * *